Dec. 16, 1941.     O. O. APP     2,265,989
FLUID PRESSURE OPERATED IMPLEMENT
Filed May 19, 1938     2 Sheets-Sheet 1
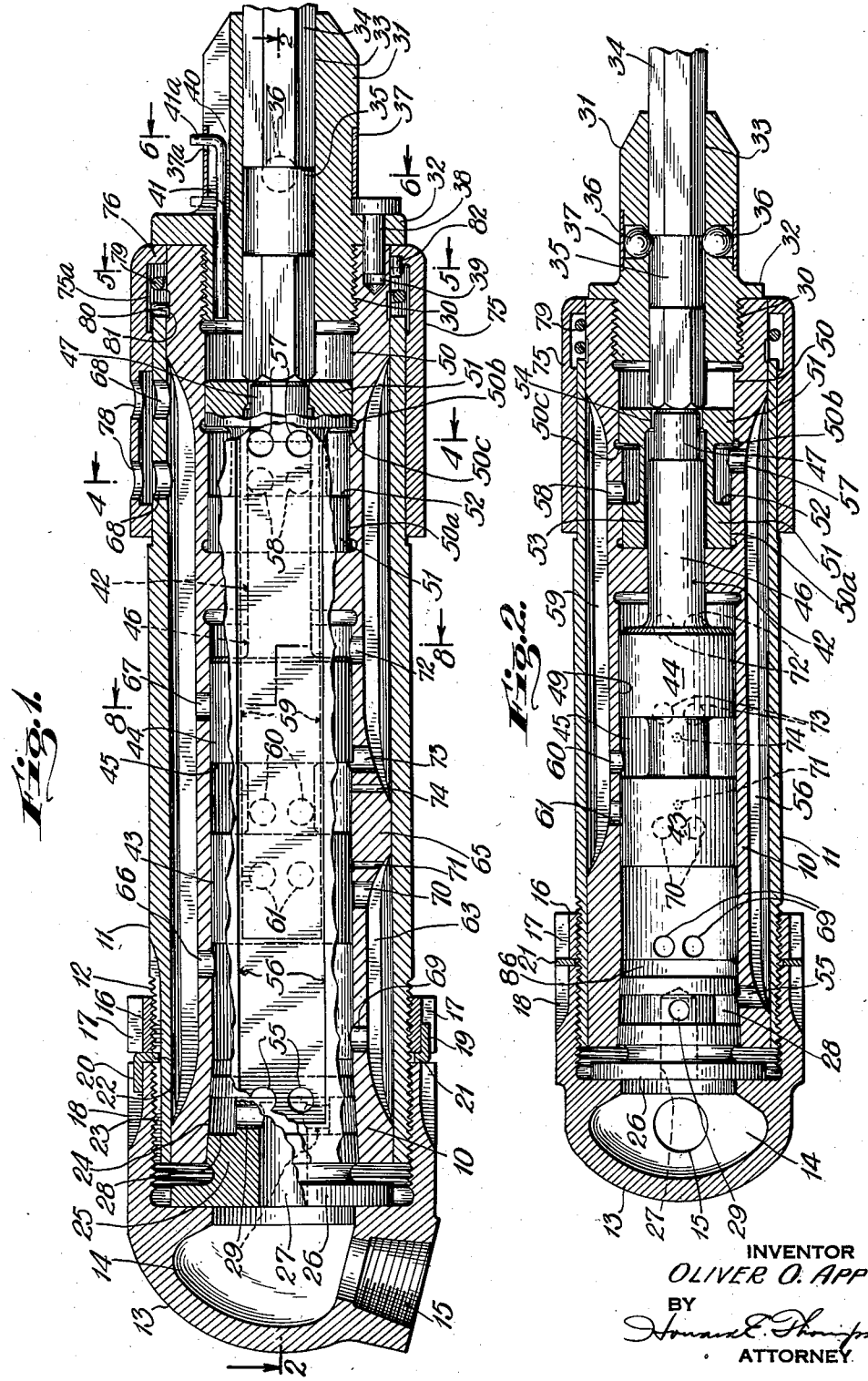
INVENTOR
*OLIVER O. APP*
BY
ATTORNEY Dec. 16, 1941.   O. O. APP   2,265,989
FLUID PRESSURE OPERATED IMPLEMENT
Filed May 19, 1938   2 Sheets-Sheet 2
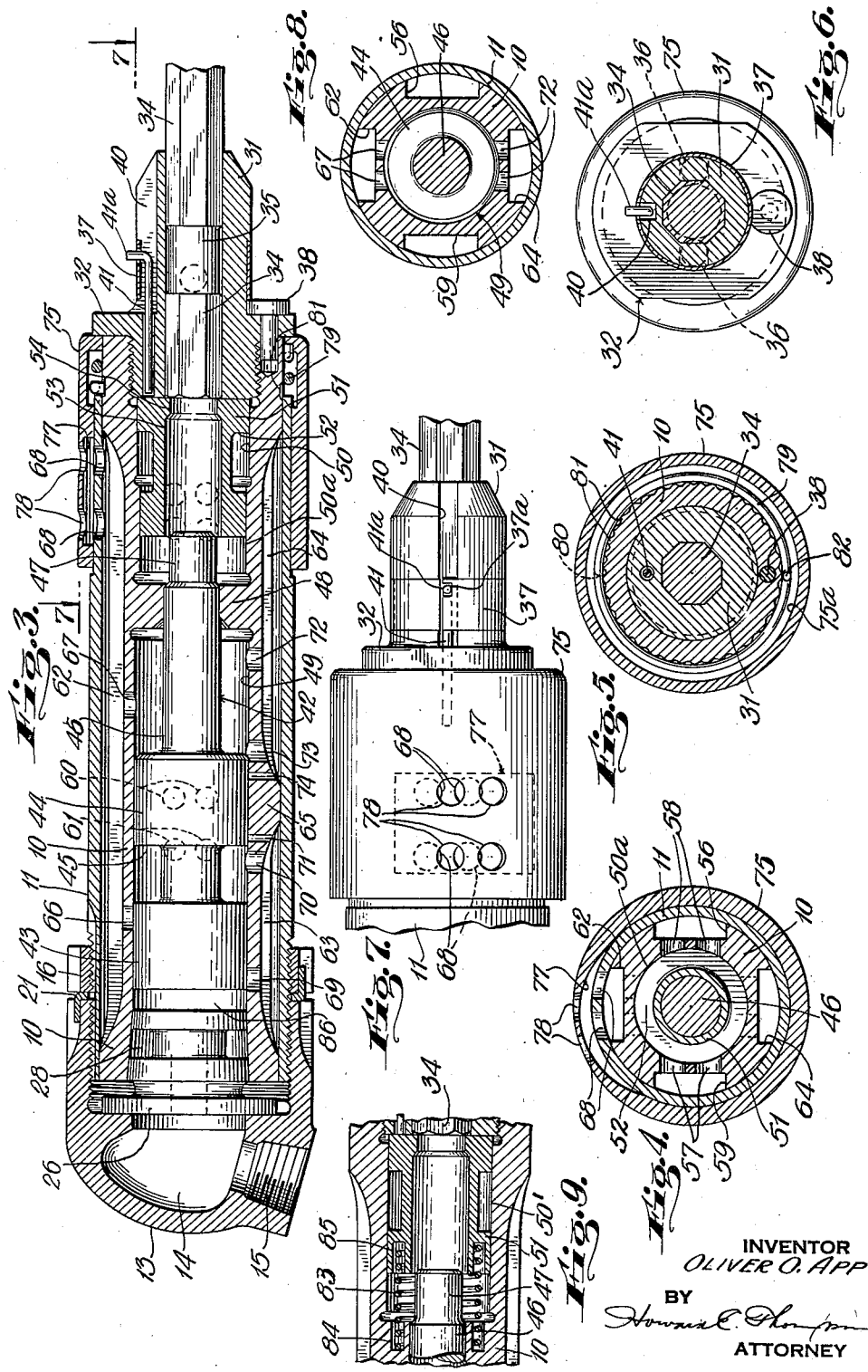
INVENTOR
OLIVER O. APP
BY
Howard C. Thompson
ATTORNEY Patented Dec. 16, 1941

2,265,989

UNITED STATES PATENT OFFICE 2,265,989

FLUID PRESSURE OPERATED IMPLEMENT

Oliver O. App, New York, N. Y., assignor to Lorintha B. App, New York, N. Y.

Application May 19, 1938, Serial No. 208,773

10 Claims. (Cl. 121—11)

This invention relates to implements operated by compressed air or other pressure fluid, and is of a type and kind generally referred to as an automatic hammer, but is adaptable for use in performing many types and kinds of operations wherein the use of a plunger or hammer reciprocating at relatively high speed is desirable; and the object of the present invention consists in providing an implement of the character defined wherein the working stroke of the hammer or plunger and the return stroke thereof is controlled by means of adjustable portage so proportioned and located as to give maximum power on the working stroke and sufficient power to return the hammer or plunger to its retracted position, and to accomplish this result without recoil or impact upon the implement, thus rendering the implement less tiring in use and handling; a further object being to provide adjustable means for controlling the exhaust pressure of the implement and thereby regulating the power of the implement in adapting the same to many different uses and also to utilize said last named means to baffle the exhaust in directing the same away from the operator in certain uses of the implement; a further object being to provide resiliently operated means in the chuck of the implement for retaining a tool against accidental displacement therefrom; a still further object being to provide means for positively retaining the valve of the implement in open position, and still further to means independently operated with respect to the last mentioned means to hold the valve normally in closed position, in such manner that the same may be moved automatically into open position by pressure applied upon the implement in the direction of the tool in the use thereof; a still further object being to provide means for automatically retaining the adjustable portage control means in different positions of adjustment; and with these and other objects in view, the invention consists in an implement of the class described which is simple in construction, efficient in use and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a longitudinal sectional view through an implement made according to my invention, with parts of the construction broken away and shown in full line.

Fig. 2 is a section on the line 2—2 of Fig. 1.

Fig. 3 is a view similar to Fig. 1, but omitting certain of the parts shown in full lines in Fig. 1 and showing parts in a different position.

Fig. 4 is a section on the irregular line 4—4 of Fig. 1.

Fig. 5 is a section on the line 5—5 of Fig. 1.

Fig. 6 is a section on the irregular line 6—6 of Fig. 1.

Fig. 7 is a view looking in the direction of the arrow 7—7 of Fig. 3.

Fig. 8 is a section on the irregular line 8—8 of Fig. 1, and

Fig. 9 is a view similar to Fig. 3 showing only a part of the construction, and showing a modification.

In the drawings, I have shown at 10 the cylinder of the implement around which is arranged an outer casing 11 in the form of a tube or sleeve, one end portion of which is externally threaded as seen at 12 to receive a hollow cap 13 having an air admission chamber 14 communicating with a source of supply through a threaded aperture 15 at one side of the cap, and a means such as a flexible tube coupled therewith and with a source of air supply as is commonly known in this art. The cap 13 is held in position on the casing 11 by a lock nut 16, and the periphery of the nut is provided with spaced notches 17 and the cap with other spaced notches 18 so as to receive laterally projecting lock lugs 19 and 20 respectively on a washer 21 disposed between the nut 17 and cap 13. The washer has a projecting key 22 extending into an elongated groove 23 in the casing as will be apparent.

The casing or sleeve 11 may have a pressed fit upon the cylinder 10 or may be secured thereon in any desired manner. However, in any event the adjacent surfaces of the parts will fit snugly so as to form a seal of the ports between the cylinder and sleeve, as later described.

The end of the cylinder adjacent the cap 13 has a tapered bore 24 in which a cylinder plug 25 is adapted to seat. The cap bears upon the outer flange portion 26 of said plug and said plug has a central port 27 communicating with the chamber 14 and opening into an annular chamber 28 formed in the tapered inner portion of the plug by radial ports 29 communicating with the bore or passage 27, as seen in Fig. 1 of the drawings.

The other end of the cylinder 10 is internally threaded as seen at 30 to relieve the chuck 31 of the implement, said chuck having a flange portion 32 of the contour clearly shown in Fig. 6 of the drawings. The chuck has a bore 33, of the cross sectional contour of the shank portion 34 of the tool or implement, to be supported in the chuck, which in the construction shown is of hexagonal cross sectional form, note Fig. 5. The shank of the tool has a reduced portion 35 outwardly of the inner end thereof so as to receive one or more steel balls 36 arranged in apertures formed in the chuck and held in engagement with the reduced portion 35 by a split spring collar 37. With this construction, the tool is held against accidental displacement from the implement and at the same time the tool may be quickly inserted and removed against the action of the spring collar 37. The length of the reduced portion 35 is sufficient to allow a little play of the tool back and forth through the chuck, as will be apparent.

The spring collar 37 also serves to hold a headed key pin 38 against displacement, as will appear in Fig. 1 of the drawings. This pin is supported in the flange 32 and enters an aperture 39 formed in the end of the cylinder, and serves to retain the chuck against accidental displacement from the cylinder.

The chuck is also provided with an elongated aperture 40 opening through the inner end thereof, in which a lock rod 41 is movably supported. The chuck is apertured to accommodate an outwardly protruding head 41a on the rod which forms a finger piece, by means of which the rod may be operated. This finger piece normally seats in a groove 37a formed in the sleeve 37 in supporting the rod 41 in inoperative position; whereas the inner edge of the sleeve 37 engages the finger piece 41a to support the rod in operative position as indicated in dotted lines in Fig. 1. The purpose of the rod is to support the valve in open position in certain uses of the implement.

Disposed within the cylinder 10 is a piston, plunger or hammer 42 having two cylindrical portions 43, 44 spaced apart by a deep annular groove 45. The stem 46 of the piston projects from the portion 44 in the direction of the chuck and terminates in a slightly reduced hammer end 47 which is adapted to strike the inner end of the shank 34 of the tool employed in the implement, as will be apparent.

The cylinder 10 has a transverse wall portion 48 apertured centrally to receive the stem 46 of the piston. The wall 48 divides the bore of the cylinder into an inner bore 49 and an outer bore having two diameter sections as at 50, 50a, the bore as at 50 being less in diameter than the bore 49, and the bore as at 50a being less in diameter than the bore 50. Arranged and movable in the bores 50, 50a is an automatic throttle valve 51 having enlarged end portions fitting closely in and operating in the bores 50, 50a and forming a large annular chamber 52 between said end portions. The bore 53 of the valve is adapted to receive the reduced stem 46 of the piston, and the valve is provided at its outer end with a reduced bore 54 for receiving the hammer end 47 of said piston.

The end of the cylinder adjacent the cap 13 is provided with an air admission passage 55 which places the annular admission passage 28 of the plug 25 in communication with a long intake passage 56 arranged longitudinally of the implement between the cylinder 10 and the casing or sleeve 11. At the forward end of the passage 56, the cylinder is provided with a port 57 which is placed in communication with a port 58 on the opposite wall of the cylinder through the annular passage 52 in the valve 51 when the valve is in open position, so that air is admitted into another elongated passage 59 arranged between the cylinder 10 and the sleeve 11 and extending rearwardly to a point to communicate with ports 60 and 61 extending into the bore 49 of the cylinder.

At right angles to the elongated passages 56 and 59, the cylinder is provided with other longitudinally extending passages, one of which is seen at 62, and the other opposed side of the cylinder is provided with two passages 63, 64 separated by an intermediate sealing web 65. The passage 62 forms an exhaust passage placing two exhaust ports 66 and 67 in the cylinder 10 in communication with a series of exhaust passages 68 formed in the sleeve 11 adjacent the chuck end of the implement. The passage 63 is placed in communication with the bore of the cylinder through ports 69 and 70 and also through bleeder ports 71, whereas the passage 64 communicates with the bore 49 of the cylinder through ports 72 and 73 and a bleeder port 74, all as clearly seen in Fig. 3 of the drawings.

At 75 I have shown an exhaust baffle in the form of a wide ring or sleeve free to rotate on the outer reduced end of the casing 11 and having an outer inturned flange 76 engaging the flange 32 of the chuck to prevent displacement from the implement. The bore of the baffle 75 has an eccentric or crescent-shaped passage 77 forming a groove or a channel adapted to register with the exhaust ports 68 of the casing, the baffle having ports 78 centrally of the passage 77 and opening to atmosphere. With this construction, by rotating the baffle upon the casing, the ports 68 may be entirely shut off, or these parts partially opened. On the other hand, the direction of the exhaust may be diverted to different angles within certain limits of adjustment of the baffle to prevent the exhaust from contacting the operator directly.

In the accompanying drawings, certain of the ports are shown in pairs, but it will be understood that any number of single or multiple port arrangements may be provided as desired. In this connection four ports have been shown, both on the baffle and on the casing to control the exhaust, but here again the number of, and arrangement of, the ports may be varied, especially on different types of implements.

The outer end portion of the baffle 75 has an enlarged bore 75a to receive a coil spring 79, one end 80 of which protrudes radially inward to engage ratchet teeth 81 formed on the outer end of the cylinder 10; whereas the other end 82 of the spring enters a socket formed in the inturned flange 76 of the baffle 75, as clearly seen in Fig. 1. With this construction, it will be apparent that the baffle may be held in different positions of adjustment upon the implement to maintain a predetermined regulated exhaust. It is preferred that the ratchet engagement be such as to permit adjustment of the baffle in either direction rather than in a single direction which can be governed by the construction of the teeth or projections employed.

It will be understood that suitable means such for example as conventional trigger controls may be substituted for the cap 13 to control the supply of compressed air to the cylinder. However, as devices of this kind are well known in the art, no specific showing thereof is deemed to be necessary in this illustration, as the same would form no part of the present invention, it being understood that any suitable means may be provided to insure a constant or intermittent supply of air to the cylinder.

In the construction shown in Fig. 9 of the drawings, a slight modification is illustrated wherein a spring 83 is disposed between a recess 84 formed in the partition wall 48 and a corresponding recess 85 formed in the throttle valve 51. This spring 83 would normally support the valve in closed position and supply of the air to the cylinder would be controlled by applying pressure upon the tool 34, the inner end of which would force the throttle valve into its open position against the action of the spring 83. In this connection it will be apparent that springs of different tensions may be provided in different kinds and classes of work, different springs being readily insertable by simply removing the chuck and the valve from the front end of the implement and then removing one spring and substituting another spring therefor. In other uses of the implement, even though the spring 83 may also be employed, the pin 41 may be moved inwardly to support the valve constantly in an open position, and this is desirable in certain types of heavy work. In using the structure of Fig. 9, the bore 50' of the cylinder receiving the valve may be of a common diameter, as will be apparent. The present implement constitutes an improvement on the structure disclosed in my prior Patent No. 1,880,337, and provides an implement which is far more sensitive and efficient in its control and operation, and in the performance of its separate functions adapting the implement to a wide range of work. In implements of the character under consideration, a recoil action has been commonly experienced by reason of the back action of the plunger when the advanced movement of the tool is resisted by engagement with the work, and also in the retracted movement of the plunger or hammer, which in my present construction is cushioned by the air in the cylinder, and further by the dash-pot action of the piston in the cylinder in passing the port 69 and entering the chamber 86, as later described. By reason of the elimination of this recoil action, a smoother performance of the implement is accomplished which enables me to perform smooth cuts through metal without any noticeable presence of chattering or excessive vibration which is commonly experienced in implements of this kind where the recoil action has not been dispensed with.

Furthermore, the implement is relatively light in weight and yet capable of performing heavy duties in which implements of the type and kind are designed and used. On the other hand, the implement may be utilized in performing various types and kinds of operations in various kinds and classes of workpieces, both in the removal of cement, plaster, mortar, and similar material and various trimming operations upon various metal workpieces, for example in trimming excessive materials at welded joints. The implement may be further used in performing different types and kinds of riveting operations, in wood carving, and in many other uses too numerous to name.

In the various uses of the implement it will be understood that tools or attachments suitable for the performance for the various functions and operations will be used in conjunction with the chuck of the implement, all made with shanks suitable for attachment to the chuck; for example in the manner illustrated. It will be further understood that the implement may be made in various sizes to adapt it to lighter and heavier work.

In the various uses of the implement, the baffle ring or sleeve may be adjusted to control and regulate the exhaust so as to increase or decrease the capacity of the exhaust or to entirely shut off the exhaust.

It will be noted upon a consideration of Fig. 2 of the drawings that an enlarged groove 50b is formed intermediate the bores 50, 50a which forms a wall 50c against which the air, acting upon the larger diameter of the valve 51, operates in moving the valve into closed position. In the normal position of the implement, as shown it will be understood that air entering the implement will normally support the valve 51 in closed position, by reason of the fact that the air in the passage 56 will pass through the port 57, and due to the larger diameter of the outer end of the valve, the valve will be held in its outermost position, and the port or ports 58 closed. However, in using the implement, the inward movement of the tool 34 in engaging a workpiece, will move the valve 51 into open position and permit air to pass into the passages 59 through the port 60 with the plunger in its outermost position. This air will then pass through the port 73 into the cylinder outwardly of the portion 44 through the port 72 and thus move the piston or plunger to its innermost position, opening the port 61 to register with the annular groove 45 of the piston. Thus air is admitted to pass into the chamber of the piston formed by said groove and to pass through the port 70, into the passage 63, and to pass into the plug end of the cylinder through the port 69 so as to advance the piston outwardly in the direction of the tool 34. The port 66 is closed in this operation, as will appear in Fig. 3 of the drawings. As the piston or plunger advances forwardly in the cylinder, the reduced groove portion 45 of the piston registers with the port 60 and gradually communication is shut off to the port 70.

It will be understood that the quick movement of the plunger will advance the hammer end 47 into engagement with the tool which is then in the position shown in Fig. 1. As the forward progress of the plunger continues, the bleeder passages 71, 74 are covered and opened respectively to overcome any balanced condition of air within the piston chamber, and air passes into the passage 64 through the port 73 and enters the inner end of the cylinder through the port 72 so as to cushion the final forward stroke of the plunger, the supply of air having been cut off by the portion 43 of the plunger.

In the above described operation, it will also be apparent that as the port 71 is fully covered, the exhaust port 66 is opened and the air at the inner head end of the piston is exhausted through the port 68 and the ports 78 of the baffle 75.

At the completion of the forward movement of the piston, it will appear from a consideration of Fig. 1 of the drawings, that the ports 61 are closed and the exhaust port 67 is closed and air is admitted to the forward end of the portion 44 of the piston through the ports 60, 73 and 72. Thus the piston will immediately be returned to its innermost position and the above cycle of operation repeated. It will be understood at this time that the valve is being held in its open position by engagement of the tool with the work. Of course when the tool is released from the work, the valve will be automatically moved into closed position in the proper cycle of operation of the implement, and thus shut off the supply air to the cylinder.

At this time it is also well to call attention to the fact that should for any reason whatever, the piston assume a neutral position on the connecting web 65, it will be found that at least one of the bleeder passages 71, 74 will be opened. Thus when the valve 51 is moved into open position as above stated, the piston will either be advanced forwardly or retracted inwardly, depending upon which of the ports 71, 74 is opened at the time. It will also be apparent that the location of the ports 72 and 73 are much closer than the arrangement of the ports 69 and 70. In other words, the ports 72 and 73 are not collectively fully opened at any time, thus the action of the air in moving the piston inwardly is with considerable less force than in the forward power stroke of the implement when the ports 69 and 70 are fully opened. In the inward movement of the plunger, the shock or impact is cushioned by virtue of the dash-pot action which is obtained inward'y of the port 69, or by reason of the chamber 86, a slight recoil action will take place so that the port 69 will be slightly open as is indicated in Fig. 3 of the drawings.

In connection with the cushioning or shockless operation of the implement as mentioned heretofore, it is important to point out that in the working stroke of the piston, the exhaust takes place in advance of the piston completing the full movement thereof, it being understood that the inertia is carried forward, notwithstanding the opening of the exhaust, in the manner of the force-back of a projected bullet. Whereas in the return stroke of the piston, it will be noted that the exhaust as at 67 is fully opened when the piston has completed substantially only half of its inward movement, thus no real pressure is applied to the piston in this movement. While some force or inertia prevails as in the working stroke, in the return stroke it is materially minimized, and in both movements of the piston, it will be understood that air is introduced into the ends of the cylinder to cushion or check the final movement of the piston in both directions. The dash-pot provided in each end of the cylinder also aids in checking the piston movement.

Having fully described my invention, what I claim as new and desire to secure by Letters Patent, is:

1. In a fluid pressure operated implement of the character described, an elongated cylinder extending throughout substantially the full length of the implement, a series of grooves arranged longitudinally of the outer surface of the cylinder intermediate the ends thereof at circumferentially spaced intervals, a sleeve arranged upon said cylinder within the terminal ends thereof forming of said grooves air passages, the cylinder being divided into a one diameter bore at the inner end and a two diameter bore at the other outer end, means arranged within and extending beyond the last named end of the cylinder for detachably supporting a tool therein, a piston having at its inner end spaced cylindrical portions fitting snugly in the first named bore and at the other end portion a reduced hammer end operating in the two diameter bore, means at the inner end of the cylinder admitting air into one passage extending longitudinally of the cylinder having a port opening into the two diameter bore thereof, a valve freely movable in the two diameter bore of the cylinder and controlling the transmission of air into another longitudinal passage in said cylinder, other ports and passages in the cylinder at longitudinally and circumferentially spaced intervals controlled by the cylindrical portions of the piston to regulate the supply of air to the first mentioned bore to control the working and return strokes of the piston, another exhaust passage communicating with said first mentioned bore and having ports opening through said sleeve, rotatably adjustable means on the sleeve controlling said exhaust ports, and means for retaining said last named means in any position of adjustment.

2. In a fluid pressure operated implement of the character described, an elongated cylinder extending throughout substantially the full length of the implement, a series of grooves arranged longitudinally of the outer surface of the cylinder intermediate the ends thereof at circumferentially spaced intervals, a sleeve arranged upon said cylinder within the terminal ends thereof forming of said grooves air passages, the cylinder being divided into a one diameter bore at the inner end and a two diameter bore at the other outer end, means arranged within and extending beyond the last named end of the cylinder for detachably supporting a tool therein, a piston having at its inner end spaced cylindrical portions fitting snugly in the first named bore and at the other end portion a reduced hammer end operating in the two diameter bore, means at the inner end of the cylinder admitting air into one passage extending longitudinally of the cylinder having a port opening into the two diameter bore thereof, a valve freely movable in the two diameter bore of the cylinder and controlling the transmission of air into another longitudinal passage in said cylinder, other ports and passages in the cylinder at longitudinally and circumferentially spaced intervals controlled by the cylindrical portions of the piston to regulate the supply of air to the first mentioned bore to control the working and return strokes of the piston, another exhaust passage communicating with said first mentioned bore and having ports opening through said sleeve, rotatably adjustable means on the sleeve controlling said exhaust ports, and means independent of said tool for controlling the operation of said valve.

3. In a fluid pressure operated implement of the character described, an elongated cylinder, a piston movable longitudinally of the cylinder and having a reduced hammer end at the outer end portion thereof, means at the outer end of the cylinder for detachably supporting a tool in the cylinder for engagement with the hammer end of the piston in the operation of the implement, means admitting air at the other end of the cylinder, means directing said air longitudinally of and to the first named end portion of the cylinder, a freely movable throttle valve in said cylinder and movable longitudinally of the hammer end of said piston for controlling the supply of air to said cylinder, other means communicating with said valve and extending longitudinally of the cylinder for directing the air to the bore thereof for actuation upon said piston to control both movements of the piston in the cylinder, said last named means including ports opening into the bore of the cylinder at longitudinally spaced intervals, means forming a dash-pot at the second named end portion of the cylinder to cushion the inward recoil stroke of the piston, means independent of said tool controlling the operation of said throttle valve, means for exhausting air from said cylinder, and rotatably adjustable means for selectively shutting off, opening and deflecting said exhaust.

4. In a fluid pressure operated implement of the character described, an elongated cylinder, a relatively long bore at one end of the cylinder, a two diameter bore at the other end portion of the cylinder, a piston movable longitudinally of the cylinder and having two spaced cylindrical portions operating in the first named cylinder bore and an integral reduced hammer end extending into and operating in the other two diameter bore, a valve, means for supporting a tool in the second named end of the cylinder for operative engagement with the hammer end of said piston, a freely movable throttle valve mounted in the two diameter bore of said cylinder, means at the first named end portion of the cylinder for introducing compressed air, means arranged longitudinally of the cylinder for extending the air to and admitting it into the two diameter bore of the cylinder, means controlled by said valve and the cylindrical portions of the piston for introducing the air into the first named bore at longitudinally and circumferentially spaced intervals to control the forward power stroke of said piston and the return retracted stroke thereof, and means for exhausting air from the first named bore only of said cylinder at the completion of the forward stroke of the piston.

5. In a fluid pressure operated implement of the class described, an elongated cylinder having a long bore at one end and a shorter bore at the other outer end, a piston operating in the long bore, a hammer part integral with the piston and operating in the shorter bore, the outer surface of the cylinder having a series of circumferentially spaced longitudinal grooves extending the major portion of the length thereof, one groove forming a supply passage and communicating with both bores at extremities beyond the limit of piston travel, another groove forming the intake passage to the long bore and having two ports placing said groove in communication with the central portion of the long bore to control admission of air to said bore, another of said grooves being divided into two parts, a plurality of ports placing each part of the last mentioned groove in communication with said long bore, the last of said grooves forming an exhaust passage having two ports communicating only with said long bore at longitudinally spaced intervals, a single sleeve arranged upon and extending longitudinally of the cylinder within the ends of said cylinder in sealing all of said grooves, said sleeve having exhaust ports opening into the last mentioned groove of said cylinder at the outer end of the cylinder, and a freely movable throttle valve arranged in the shorter bore and movable longitudinally of the hammer in controlling the supply of air from the first mentioned groove to the second mentioned groove.

6. In a fluid pressure operated implement of the class described, an elongated cylinder having a long bore at one end and a shorter bore at the other outer end, a piston operating in the long bore, a hammer part integral with the piston and operating in the shorter bore, the outer surface of the cylinder having a series of circumferentially spaced longitudinal grooves extending the major portion of the length thereof, one groove forming a supply passage and communicating with both bores at extremities beyond the limit of piston travel, another groove forming the intake passage to the long bore and having two ports placing said groove in communication with the central portion of the long bore to control admission of air to said bore, another of said groove being divided into two parts, a plurality of ports placing each part of the last mentioned groove in communication with said long bore, the last of said grooves forming an exhaust passage having two ports communicating only with said long bore at longitudinally spaced intervals, a single sleeve arranged upon and extending longitudinally of the cylinder within the ends of said cylinder in sealing all of said grooves, said sleeve having exhaust ports opening into the last mentioned groove of said cylinder at the outer end of the cylinder, a freely movable throttle valve arranged in the shorter bore and movable longitudinally of the hammer in controlling the supply of air from the first mentioned groove to the second mentioned groove, means at the outer end portion of the cylinder for detachably supporting a tool in the cylinder for engagement with the hammer in the operation of the implement, and means adjustable in said last named means cooperating with the throttle valve to control the operation thereof.

7. In a fluid pressure operated implement of the class described, an elongated cylinder having a long bore at one end and a shorter bore at the other outer end, a piston operating in the long bore, a hammer part integral with the piston and operating in the shorter bore, the outer surface of the cylinder having a series of circumferentially spaced longitudinal grooves extending the major portion of the length thereof, one groove forming a supply passage and communicating with both bores at extremities beyond the limit of piston travel, another groove forming the intake passage to the long bore and having two ports placing said groove in communication with the central portion of the long bore to control admission of air to said bore, another of said grooves being divided into two parts, a plurality of ports placing each part of the last mentioned groove in communication with said long bore, the last of said grooves forming an exhaust passage having two ports communicating only with said long bore at longitudinally spaced intervals, a single sleeve arranged upon and extending longitudinally of the cylinder within the ends of said cylinder in sealing all of said grooves, said sleeve having exhaust ports opening into the last mentioned groove of said cylinder at the outer end of the cylinder, a freely movable throttle valve arranged in the shorter bore and movable longitudinally of the hammer in controlling the supply of air from the first mentioned groove to the second mentioned groove, a supplemental sleeve rotatably mounted on the cylinder and first named sleeve, a circumferential chamber in the supplemental sleeve registering with the exhaust ports of said first named sleeve, and the chambered portion of the supplemental sleeve having exhaust ports adjustable in controlling the exhaust from said implement.

8. In an air hammer of the class described employing an air operated piston having a hammer end and a tool detachably supported in position to be engaged by the hammer end of said piston, a cylinder construction controlling and checking movement of the piston into the operative and blow position and the return withdrawal position, said cylinder comprising an elongated tube, divided into a piston end and a valve end, said tube having circumferentially spaced and longitudinally extending grooves in the outer surface thereof with ports extending from said grooves into the piston and valve ends of the tube to control intake and exhaust of air in the operation of said hammer, a sleeve mounted upon said tube within the limits of the end portions thereof for sealing said grooves, one end of the sleeve having exhaust ports opening into said first mentioned grooves, a supplemental sleeve adjustably supported on the first mentioned sleeve and said tube, and means in said last named sleeve for regulating the discharge of air from said exhaust ports in the rotation of said sleeve.

9. In an air hammer of the class described employing a tubular cylinder and a sleeve encircling the cylinder with air admission and distributing passages formed between the sleeve and cylinder at circumferentially spaced intervals, a piston operating in one chamber of the cylinder and a throttle valve operating in another chamber thereof, the piston having a hammer end extending into the second chamber, the cylinder having ports opening into said passages placing the chambers in communication, said valve controlling communication between two of said passages in controlling the supply of air to the piston chamber, an exhaust passage in communication with the piston chamber and having a discharge opening outwardly through said sleeve, and said exhaust passage being sealed from said valve chamber.

10. In a fluid pressure operated implement of the character described, employing a cylinder having an air operated piston movable longitudinally thereof controlling the operation of a tool supported in the outer end of the cylinder, of a valve movable in the cylinder at the outer end portion thereof controlling the admission of air into the cylinder for the actuation of said piston, means for admitting air to the other inner end portion of the cylinder and for directing the same longitudinally of the cylinder to said valve to provide a constant supply of air to the valve, said valve being actuated by the tool supported in said implement in one use of the implement, and other means adjustably supported at the outer end portion of the cylinder for normally supporting the valve in open position in other uses of the implement.

OLIVER O. APP.